United States Patent
Covington et al.

(10) Patent No.: US 9,783,290 B2
(45) Date of Patent: Oct. 10, 2017

(54) JAM-TOLERANT ROTARY CONTROL MOTOR FOR HYDRAULIC ACTUATOR VALVE

(71) Applicant: Bell Helicopter Textron Inc., Fort Worth, TX (US)

(72) Inventors: Charles Eric Covington, Colleyville, TX (US); Carlos A. Fenny, Arlington, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 1027 days.

(21) Appl. No.: 14/038,182

(22) Filed: Sep. 26, 2013

(65) Prior Publication Data

US 2016/0340034 A1 Nov. 24, 2016

Related U.S. Application Data

(60) Provisional application No. 61/782,492, filed on Mar. 14, 2013.

(51) Int. Cl.

| | |
|---|---|
| *B64C 3/38* | (2006.01) |
| *B64C 27/64* | (2006.01) |
| *H01F 7/06* | (2006.01) |
| *H01F 7/122* | (2006.01) |
| *B64C 27/605* | (2006.01) |
| *H02K 7/00* | (2006.01) |

(52) U.S. Cl.
CPC ............ *B64C 27/64* (2013.01); *B64C 27/605* (2013.01); *H01F 7/066* (2013.01); *H01F 7/122* (2013.01); *H02K 7/003* (2013.01)

(58) Field of Classification Search
CPC ....... B64C 27/64; B64C 27/605; H01F 7/003; H01F 7/06; H01F 7/605
USPC ..... 251/65, 129.11–129.13, 229; 137/625.65
See application file for complete search history.

(56) References Cited

U.S. PATENT DOCUMENTS

| | | | | |
|---|---|---|---|---|
| 4,530,487 | A * | 7/1985 | Tew | .......................... F15B 9/12 251/129.2 |
| 7,828,245 | B2 * | 11/2010 | Suisse | ..................... B64C 13/40 137/625 |
| 2004/0238051 | A1 * | 12/2004 | Tranovich | ........... F15B 13/0402 137/625.65 |

OTHER PUBLICATIONS

Moog, Electrohydraulic Valves . . . A Technical Look, date unknown.

* cited by examiner

*Primary Examiner* — Richard G Davis

(57) ABSTRACT

According to one embodiment, a linear control motor includes a first permanent magnet, a coil, a shaft, a first non-magnetic material, and a joint coupled between the shaft and a spool operable to convert rotations of the shaft into axial movements of the spool. The first non-magnetic material is disposed between at least one of the movable components and at least one of the static components and operable to prevent physical contact between at least one of the movable components and at least one of the static components.

5 Claims, 18 Drawing Sheets

JAM-TOLERANT ROTARY CONTROL MOTOR FOR HYDRAULIC ACTUATOR VALVE

TECHNICAL FIELD

This invention relates generally to rotorcraft flight control systems, and more particularly, to a jam-tolerant linear control motor for a hydraulic actuator valve.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more devices to rotate, deflect, and/or adjust rotor blades.

SUMMARY

Particular embodiments of the present disclosure may provide one or more technical advantages. A technical advantage of one embodiment may include the capability to reduce magnetic seizing in a control motor for a rotorcraft blade actuator. A technical advantage of one embodiment may include the capability to detect bearing failures in a control motor prior to catastrophic failure. A technical advantage of one embodiment may include the capability to reduce failures in joints that convert rotary motion into linear motion.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
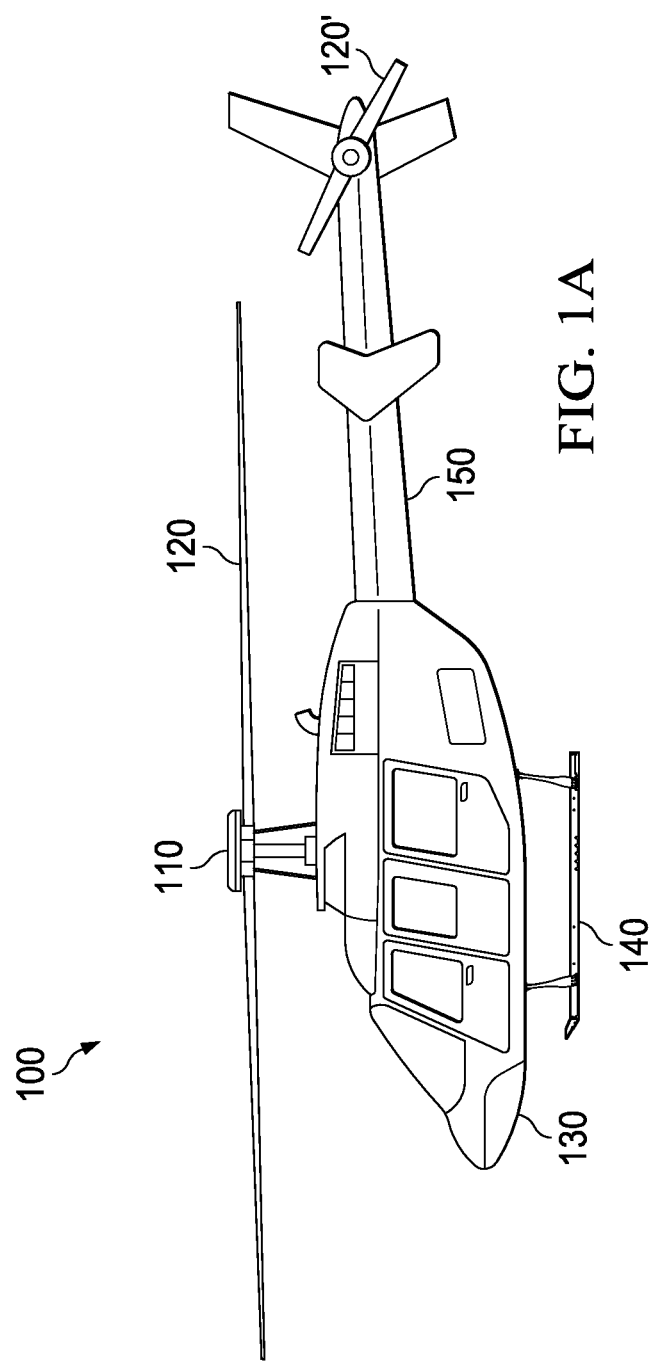
FIG. 1A shows a rotorcraft according to one example configuration.

FIG. 1A shows a rotorcraft 100 according to one example configuration. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 1B:
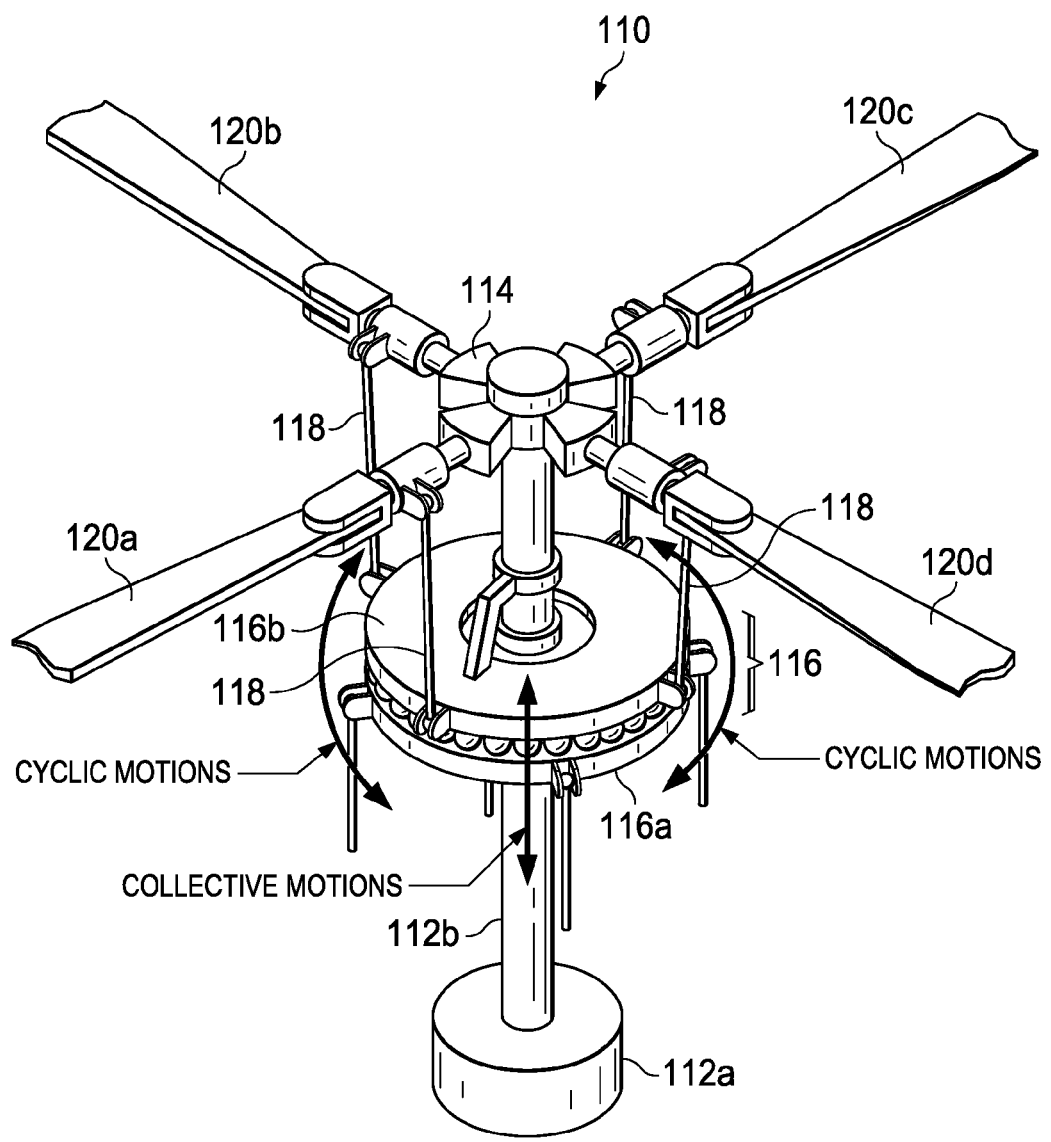
FIG. 1B shows the rotor system and blades of FIG. 1A according to one example configuration.

FIG. 1B shows rotor system 110 and blades 120 of FIG. 1A according to one example configuration. In the example configuration of FIG. 1B, rotor system 110 features a power train 112, a hub 114, a swashplate 116, and pitch links 118. In some examples, rotor system 110 may include more or fewer components. For example, FIG. 1B does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 1B, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

Redundant flight control components may be provided to improve safety of rotorcraft 100. For example, the rotor system 110 of FIG. 1B may include redundant components for controlling deflection and position of blades 120. However, providing flight control redundancy in a rotorcraft, such as the example rotorcraft 100, may be somewhat more difficult than providing flight control redundancy in a fixed-wing aircraft.

Figure 2A:
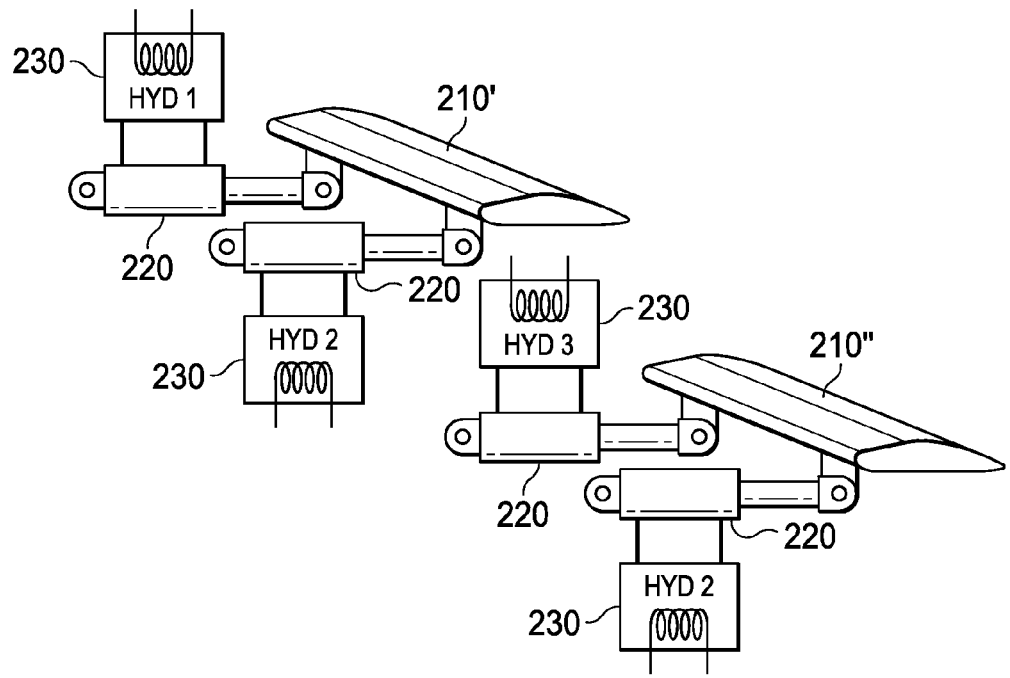
FIG. 2A shows an example redundant control system for a fixed-wing aircraft.
Figure 2B:
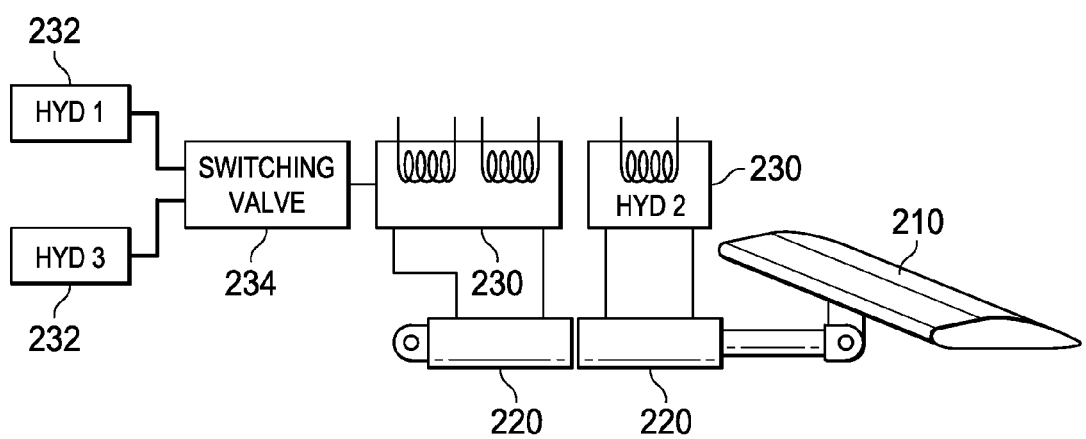
FIG. 2B shows an example redundant control system for a rotorcraft such as the rotorcraft of FIG. 1A.

FIGS. 2A and 2B show example redundant control systems for a fixed-wing aircraft and for a rotorcraft. The example of FIG. 2A represents a redundant control system for a fixed-wing aircraft. In the example of FIG. 2A, two redundant flight control devices 210' and 210" are provided. Each flight control device is controlled by two redundant actuators 220 (for a total of four actuators). The four actuators 220 are controlled by three redundant hydraulic systems 230.

The example of FIG. 2B, on the other hand, represents a redundant control system for a rotorcraft. Unlike the example of FIG. 2A, the system of FIG. 2B includes a single flight control device 210. In this example embodiment, flight control device 210 may represent a rotorcraft flight control component, such as swashplate 116, that does not have a redundant counterpart installed on rotorcraft 100.

Teachings of certain embodiments recognize that providing redundancy in the system of FIG. 2B is therefore more important when only a single flight control device 210 is provided. In the example of FIG. 2B, two redundant actuators 220 are provided to position flight control device 210. The two redundant actuators 220 are controlled by hydraulic systems 230, hydraulic systems 232, and a switching valve 234.

In one example embodiment, actuators 220 and hydraulic systems 230 may represent the dual motor dual concentric valve actuator 101 described and/or suggested by U.S. Pat. No. 7,828,245, issued on Nov. 9, 2010. For example, actuator 220 may represent the parallel dual piston actuator 111 of U.S. Pat. No. 7,828,245, and hydraulic system 230 may represent dual concentric valve 202, which is controlled by motor 119. U.S. Pat. No. 7,828,245 is hereby incorporated by reference in its entirety.

Although the example of FIG. 2B features redundant actuators 220, FIG. 2B shows the redundant actuators 220 coupled together in series. Thus, in this example, failure by one actuator 220 could cause the redundant actuator 220 to fail. For example, if one actuator 220 locks in a fixed position, the locked actuator 220 could prevent the redundant 220 from moving.

Accordingly, teachings of certain embodiments recognize that performance of actuator 220 may be critical to flight safety. As will be explained in greater detail below, teachings of certain embodiments recognize the capability to prevent failures of actuator 220. In particular, teachings of certain embodiments recognize the capability to prevent failures of actuator 220 by preventing failures of the control motor that controls hydraulic fluid flow to actuator 220.

Figure 3:
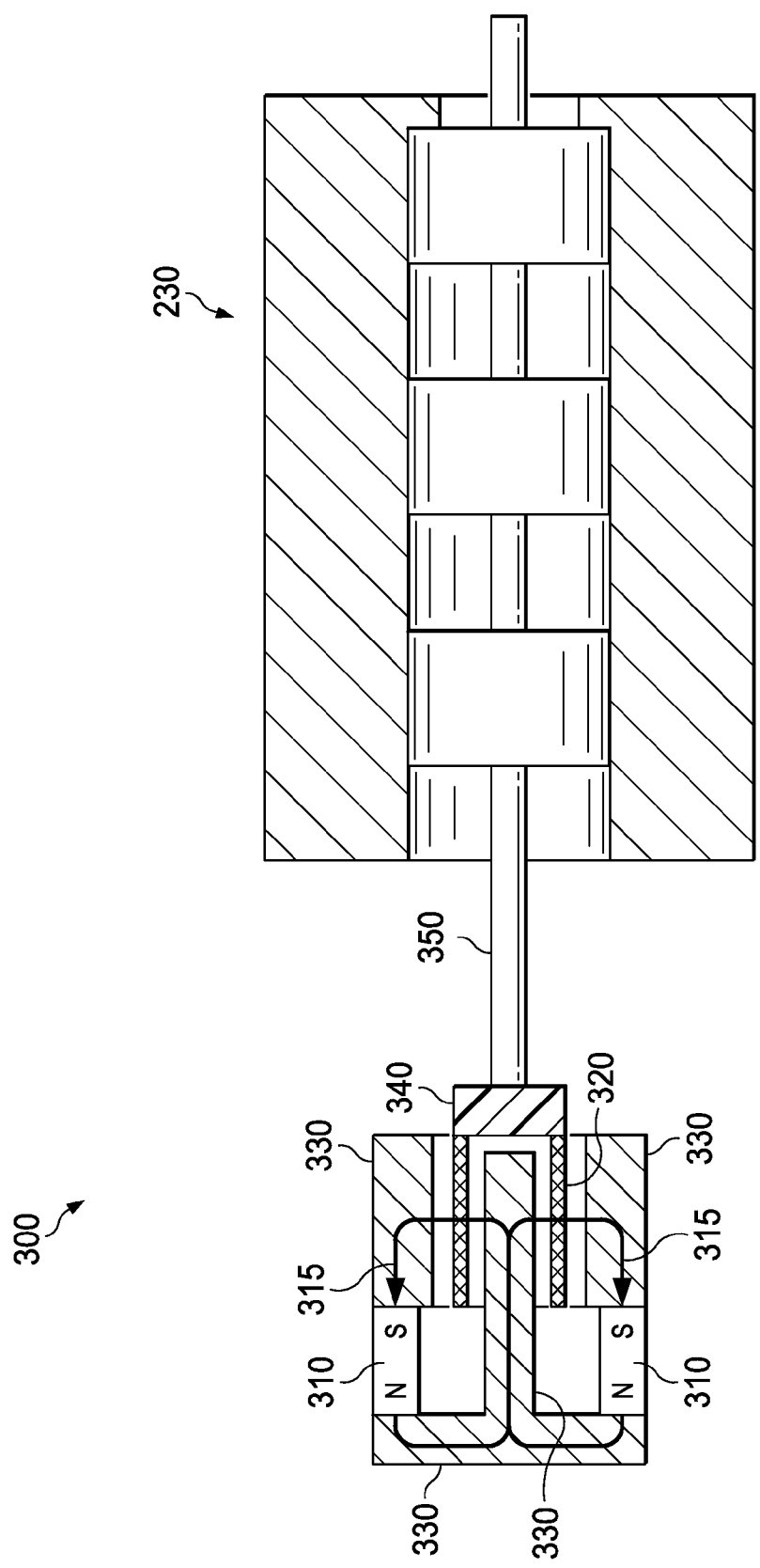
FIG. 3 shows a cross-section view of a linear control motor according to one example embodiment.

FIG. 3 shows a cross-section view of a control motor 300 according to one example embodiment. In the example of FIG. 3, control motor 300 is coupled to hydraulic system 230. In some embodiments, hydraulic system 230 may represent dual concentric valve 202 of U.S. Pat. No. 7,828,245, and control motor 300 may represent an example configuration of the motor 119 of U.S. Pat. No. 7,828,245. In the example of FIG. 3, hydraulic system 230 is shown as a simplified hydraulic valve featuring a servo valve and a spool extending through the servo valve.

In the example of FIG. 3, control motor 300 features a magnet 310, a coil 320, magnetic material 330, non-magnetic material 340, and a shaft 350. In this example, magnet 310 and magnetic material 330 may be considered static components, and coil 320 may be considered a movable component. A movable component may represent any component that moves relative to a static component. A static component may be considered fixed relative to movable components, although in reality static components themselves may be subject to some movement.

In operation, magnet 310 generates magnetic flux along magnetic flux path 315. Magnetic material 330 is disposed at least partially in magnetic flux path 315 and may reduce loss of flux along magnetic flux path 315. Coil 320 selectively adds magnetic flux to and/or subtracts magnetic flux from magnetic flux path 315. Adding or subtracting magnetic flux may cause coil 320 to move linearly within control motor 300. Non-magnetic material 340 and shaft 350 couple coil 320 to the spool of hydraulic system 230 such that the spool of hydraulic system 230 moves in response variations in magnetic flux in magnetic flux path 315.

Magnet 310 may represent any material or object that is operable to produce a magnetic field and/or generate a magnetic flux path. Examples of magnet 310 may include a permanent magnet or an electromagnetic. Coil 320 may represent any material or object that is operable to add or remove flux to or from a magnetic flux path. In some embodiments, coil 320 resembles a series of loops of conductive material, such as solid copper wire. Magnetic material 330 may represent any material or object that is attracted to (or repulsed by) a magnet. In some embodiments, magnetic material 330 may include ferromagnetic materials, such as iron, nickel, cobalt, rare earth magnets, and some alloys. Non-magnetic material 340 may represent material is not attracted to (or repulsed by) a magnet. Examples of non-magnetic material 340 may include some rubbers, plastics, and wood.

In the example of FIG. 3, coil 320 is disposed within control motor 300 adjacent to magnetic material 330. During normal operation, coil 320 may be free to move linearly within control motor 300 adjacent to magnetic material 330. A failure can occur, however, if coil 320 magnetically seizes to magnetic material 330. In this failure mode, coil 320 becomes fixed and prevents shaft 350 from moving the spool of hydraulic system 230, which may result in a failure of the actuator 220 coupled to hydraulic system 230. Accordingly, as will be explained in greater detail below, teachings of certain embodiments recognize the capability to prevent failures of actuator 220 and hydraulic system 230 by preventing magnetic seizing of the control motor.

Figure 4:
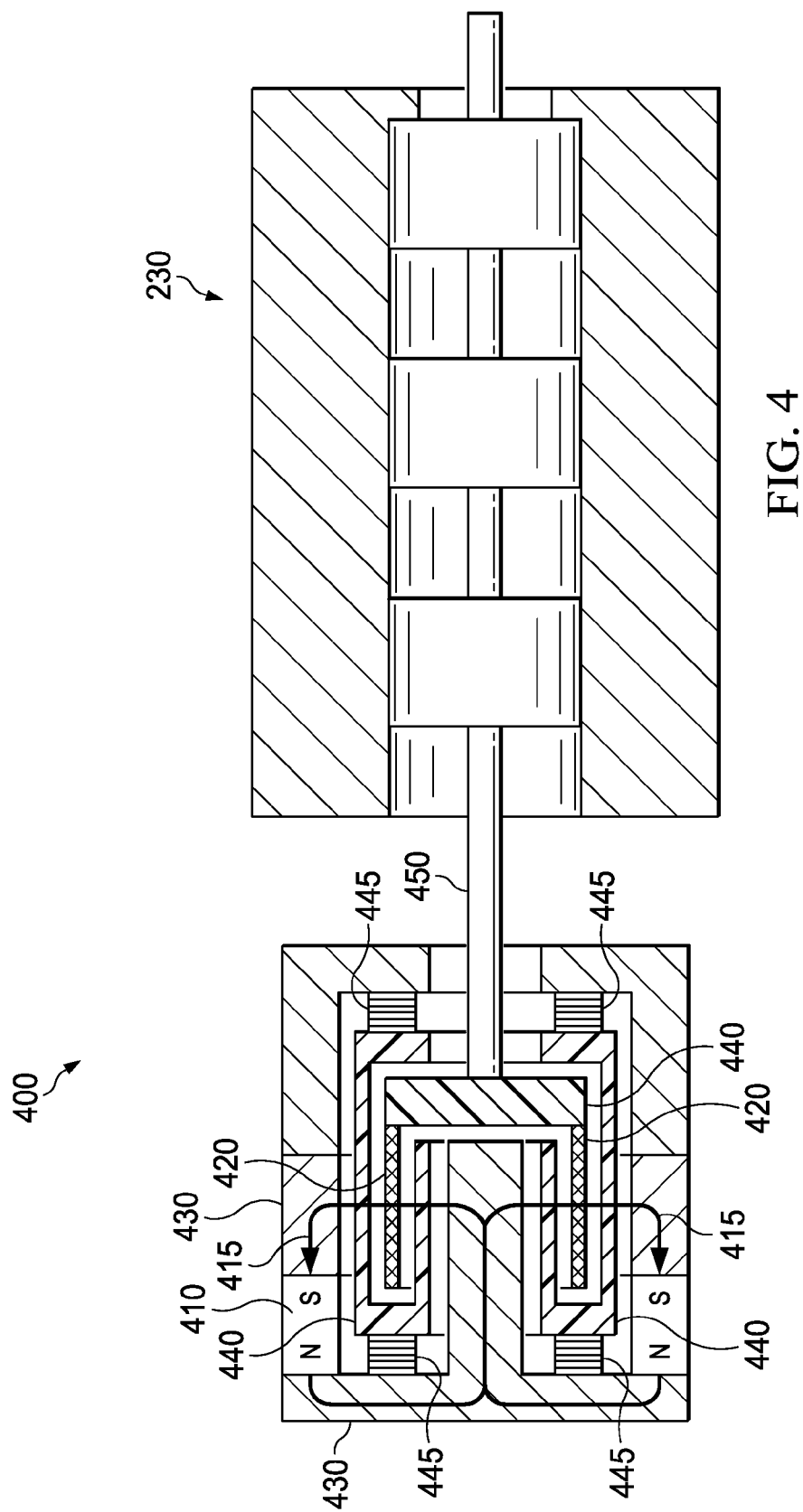
FIG. 4 shows a cross-section view of a linear control motor according to another example embodiment.

FIG. 4 shows a cross-section view of a control motor 400 according to one example embodiment. In the example of FIG. 4, control motor 400 is coupled to hydraulic system 230. In some embodiments, hydraulic system 230 may represent dual concentric valve 202 of U.S. Pat. No. 7,828, 245, and control motor 400 may represent an example configuration of the motor 119 of U.S. Pat. No. 7,828,245. In the example of FIG. 4, hydraulic system 230 is shown as a simplified hydraulic valve featuring a servo valve and a spool extending through the servo valve.

In the example of FIG. 4, control motor 400 features a magnet 410, a coil 420, magnetic material 430, non-magnetic material 440, and a shaft 450. In some embodiments, some of these components may resemble the magnet 310, coil 320, magnetic material 330, non-magnetic material 340, and shaft 350 of control motor 300. Unlike control motor 300, however, control motor 400 features additional non-magnetic material 440 separating coil 420 from magnetic material 430. Teachings of certain embodiments recognize that the non-magnetic material 440 may prevent coil 420 from seizing to magnetic material 430 by preventing physical contact between coil 420 and the magnetic material 430.

In the example of FIG. 4, control motor 400 also features springs 445 that may allow the non-magnetic material 440 to move somewhat relative to coil 420 and/or magnetic material 430. Teachings of certain embodiments recognize that allowing some movement by the non-magnetic material 440 separating coil 420 from magnetic material 430 may further reduce seizing by control motor 400.

Figure 5:
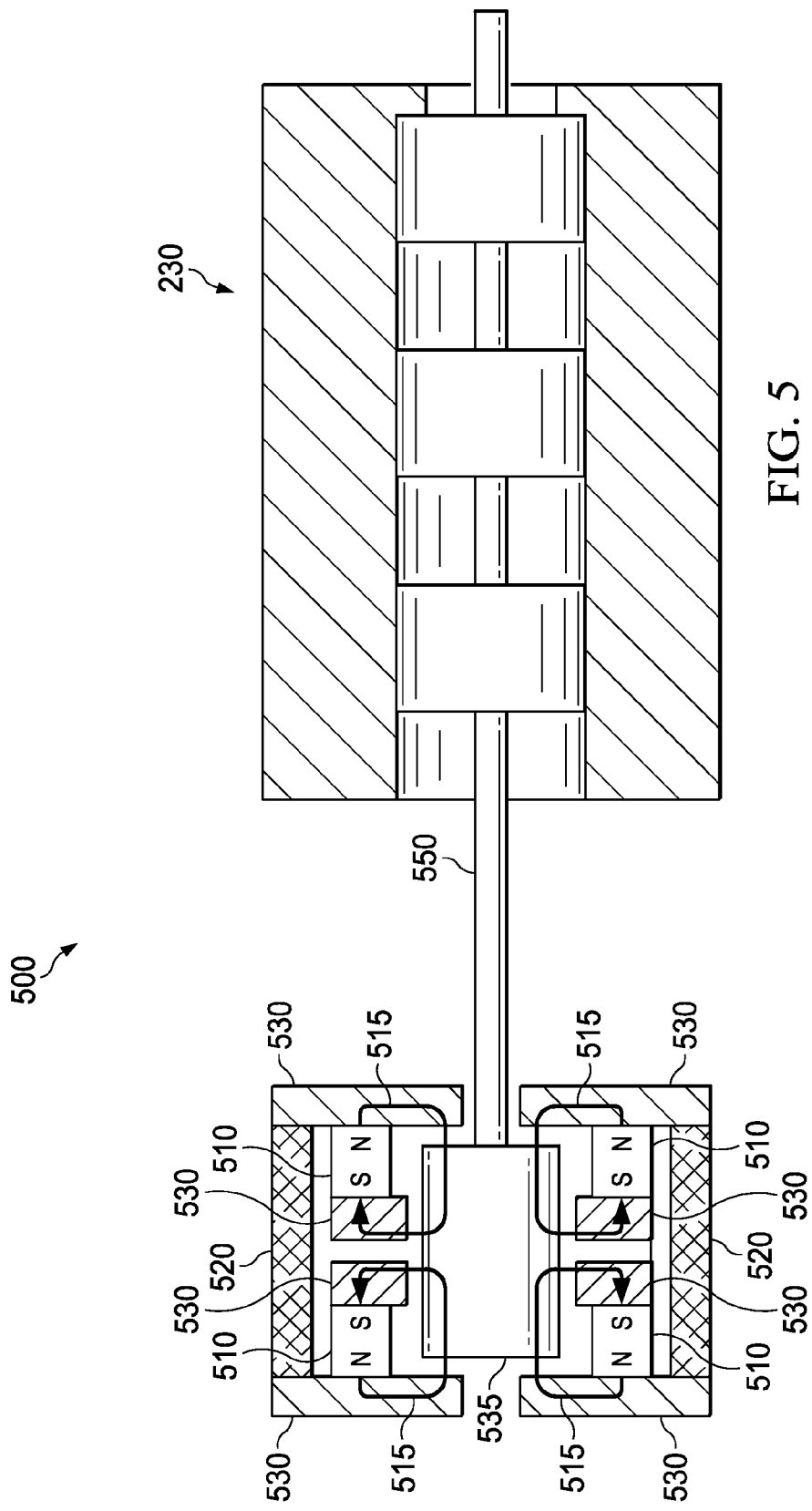
FIG. 5 shows a cross-section view of a linear control motor according to yet another example embodiment.

FIG. 5 shows a cross-section view of a control motor 500 according to one example embodiment. Control motor 500 may represent an alternative configuration of the control motor 300 of FIG. 3. In the example of FIG. 5, control motor 500 is coupled to hydraulic system 230. In some embodiments, hydraulic system 230 may represent dual concentric valve 202 of U.S. Pat. No. 7,828,245, and control motor 500 may represent an example configuration of the motor 119 of U.S. Pat. No. 7,828,245. In the example of FIG. 5, hydraulic system 230 is shown as a simplified hydraulic valve featuring a servo valve and a spool extending through the servo valve.

In the example of FIG. 5, control motor 500 features magnets 510, a coil 520, magnetic material 530, a magnetic armature 535, non-magnetic material 540, and a shaft 550. In this example, magnets 510, coil 520, and magnetic material 530 may be considered static components, and armature 535 may be considered a movable component.

In operation, magnets 510 generate magnetic flux along magnetic flux paths 515. Magnetic material 530 is disposed at least partially in a magnetic flux path 515 and may reduce loss of flux along magnetic flux path 515. Coil 520 selectively adds magnetic flux to and/or subtracts magnetic flux from magnetic flux paths 515. Magnetic armature 535 is also at least partially disposed in the magnetic flux paths 515. Adding or subtracting magnetic flux may cause magnetic armature 535 to move linearly within control motor 500. Non-magnetic material 540 and shaft 550 couple magnetic armature 535 to the spool of hydraulic system 230 such that the spool of hydraulic system 230 moves in response variations in magnetic flux in magnetic flux paths 515.

In the example of FIG. 5, magnets 510 generate two magnetic flux paths 515. In this example, magnetic flux paths 515 flow in opposite directions such that the first magnetic flux path 515 is operable to move magnetic armature 535 in a first direction and the second magnetic flux path 515 is operable to move magnetic armature 535 in an opposite second direction. If the magnitude of the two magnetic flux paths 515 is equal, the two magnetic flux paths may substantially maintain magnetic armature 535 in equilibrium. If the magnitude of the two magnetic flux paths 515 is not equal, then equilibrium is not maintained, and magnetic armature 535 may move linearly as a result of the difference in flux in the two magnetic flux paths.

Magnet 510 may represent any material or object that is operable to produce a magnetic field and/or generate a magnetic flux path. Examples of magnet 510 may include a permanent magnet or an electromagnetic. Coil 520 may represent any material or object that is operable to add or remove flux to or from a magnetic flux path. In some embodiments, coil 520 resembles a series of loops of conductive material, such as solid copper wire. Magnetic material 530 and magnetic armature 535 may represent any material or object that is attracted to (or repulsed by) a magnet. In some embodiments, magnetic material 530 and magnetic armature 535 may include ferromagnetic materials, such as iron, nickel, cobalt, rare earth magnets, and some alloys. Non-magnetic material 540 may represent material is not attracted to (or repulsed by) a magnet. Examples of non-magnetic material 540 may include some rubbers, plastics, and wood.

In the example of FIG. 5, magnetic armature 535 is disposed within control motor 500 adjacent to magnets 510 and/or magnetic material 530. During normal operation, magnetic armature 535 may be free to move linearly within control motor 500 adjacent to magnets 510 and/or magnetic material 530. A failure can occur, however, if magnetic armature 535 magnetically seizes to magnets 510 and/or magnetic material 530. In this failure mode, magnetic armature 535 becomes fixed and prevents shaft 550 from moving the spool of hydraulic system 230, which may result in a failure of the actuator 220 coupled to hydraulic system 230. Accordingly, as will be explained in greater detail below, teachings of certain embodiments recognize the capability to prevent failures of actuator 220 and hydraulic system 230 by preventing magnetic seizing of the control motor.

Figure 6:
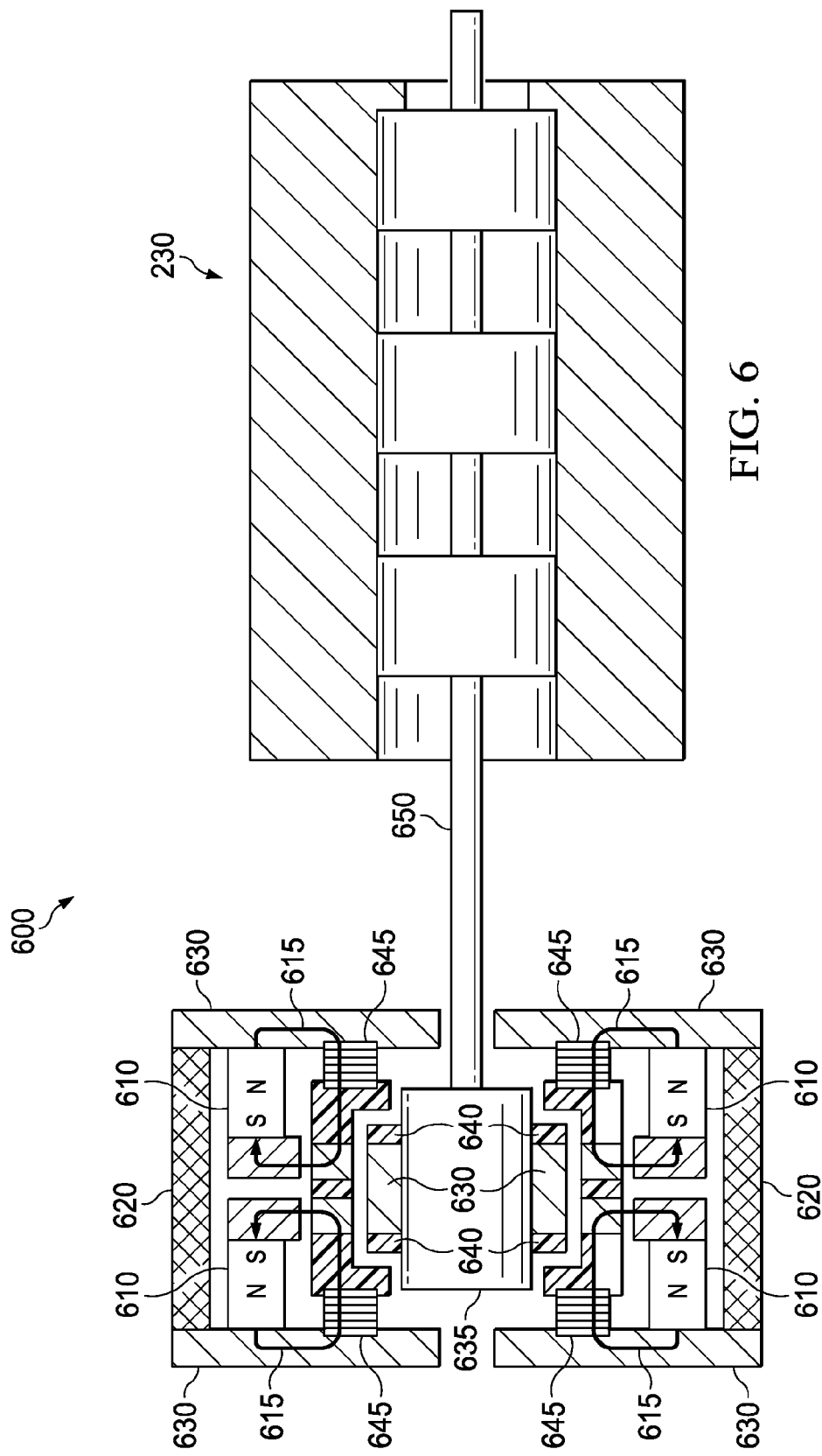
FIG. 6 shows a cross-section view of a linear control motor according to yet another example embodiment.

FIG. 6 shows a cross-section view of a control motor 600 according to one example embodiment. In the example of FIG. 6, control motor 600 is coupled to hydraulic system 230. In some embodiments, hydraulic system 230 may represent dual concentric valve 202 of U.S. Pat. No. 7,828, 245, and control motor 600 may represent an example configuration of the motor 119 of U.S. Pat. No. 7,828,245. In the example of FIG. 6, hydraulic system 230 is shown as a simplified hydraulic valve featuring a servo valve and a spool extending through the servo valve.

In the example of FIG. 6, control motor 600 features a magnet 610, a coil 620, magnetic material 630, magnetic armature 635, non-magnetic material 640, and a shaft 650. In some embodiments, some of these components may resemble the magnet 510, coil 520, magnetic material 530, magnetic armature 535, non-magnetic material 540, and shaft 550 of control motor 500. Unlike control motor 500, however, control motor 600 features additional non-magnetic material 640 separating magnetic armature 635 from magnets 610 and magnetic material 630. Teachings of certain embodiments recognize that the non-magnetic material 640 may prevent magnetic armature 635 from seizing to magnets 610 and/or magnetic material 630 by preventing physical contact between magnetic armature 635 and the magnets 610 and/or magnetic material 630.

In the example of FIG. 6, control motor 600 also features springs 645 that may allow the non-magnetic material 640 to move somewhat relative to magnetic armature 635, magnets 610, and/or magnetic material 630. Teachings of certain embodiments recognize that allowing some movement by the non-magnetic material 640 separating magnetic armature 635 from magnets 610 and/or magnetic material 630 may further reduce seizing by control motor 600.

In the examples of FIGS. 3-6, the control motor includes a shaft that moves linearly in an effort to adjust the spool of a hydraulic system 230. Teachings of certain embodiments recognize, however, the ability to provide a rotary control motor that adjusts the spool of a hydraulic system 230.

Figure 7A:
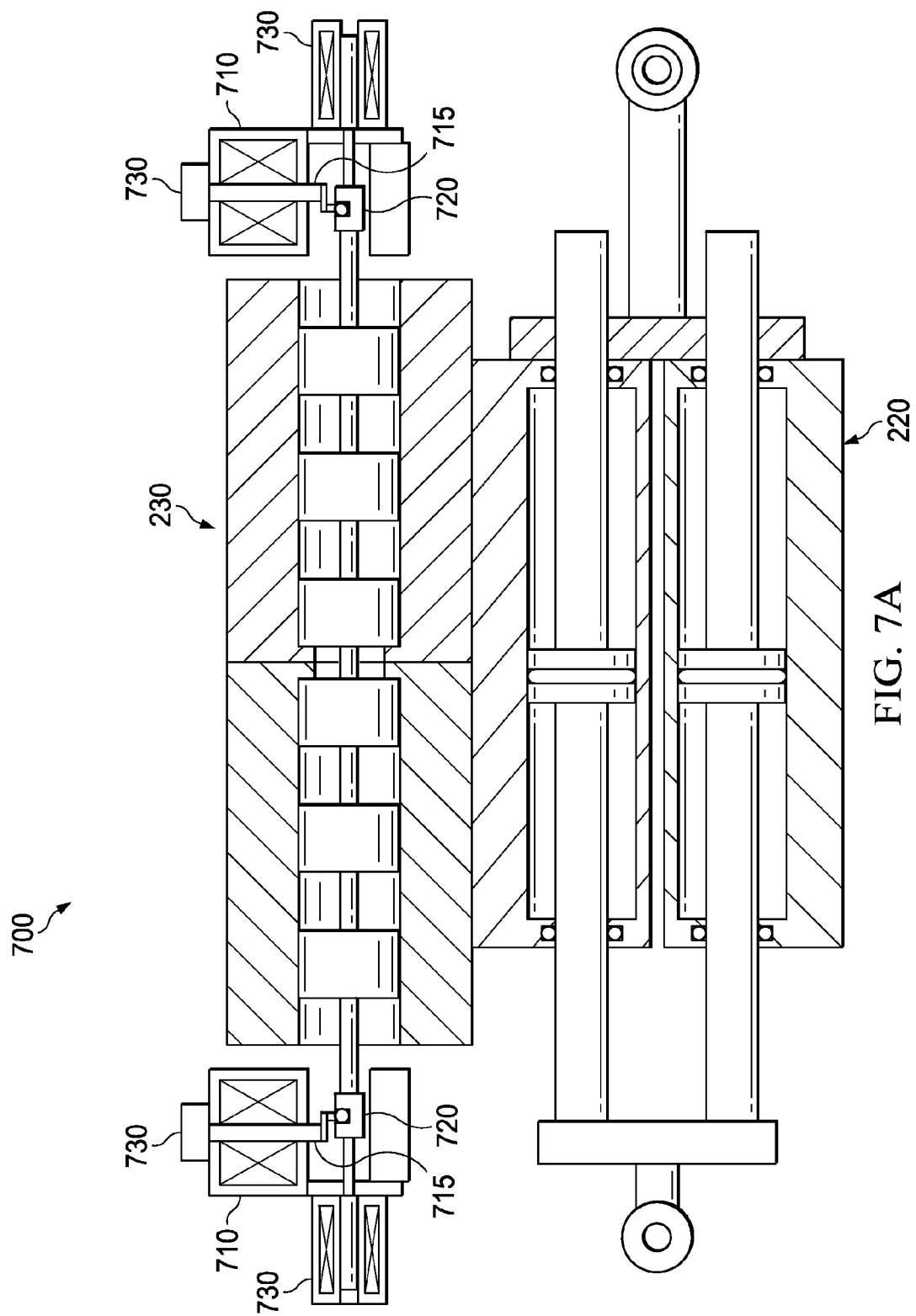
FIG. 7A shows a control system featuring a rotary control motor, a hydraulic system, and an actuator according to one example embodiment.

FIG. 7A shows a control system 700 featuring a control motor 710, a hydraulic system 230, and an actuator 220. In the example of FIG. 7, control motor 710, hydraulic system 230, and actuator 220 may resemble the motor 119, the dual concentric valve 202, and the parallel dual piston actuator 111 of U.S. Pat. No. 7,828,245.

As seen in the example of FIG. 7, control motor 710 is a rotary control motor that adjusts the spool of hydraulic system 230 by rotating its output shaft 715. A joint 720 converts rotation of the output shaft 715 into linear movements of the spool of hydraulic system 230. Measurement devices 730 measure rotation of the output shaft 715 and linear movement of the spool of hydraulic system 230. In one example embodiment, measurement devices 730 are differential transformers (e.g., linear variable differential transformers).

Figure 7B:
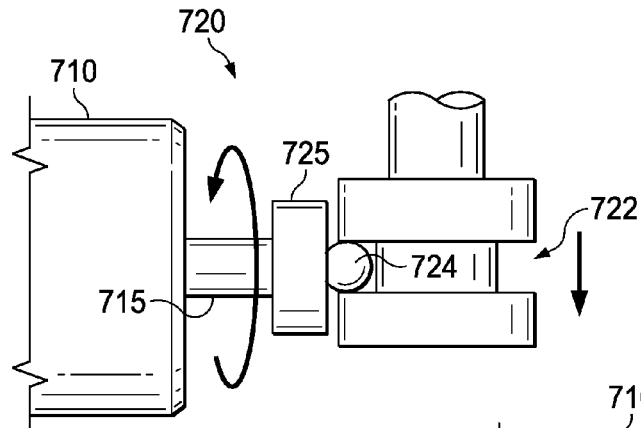
FIG. 7B shows side view of a joint associated with the control system of FIG. 7A.
Figure 7C:
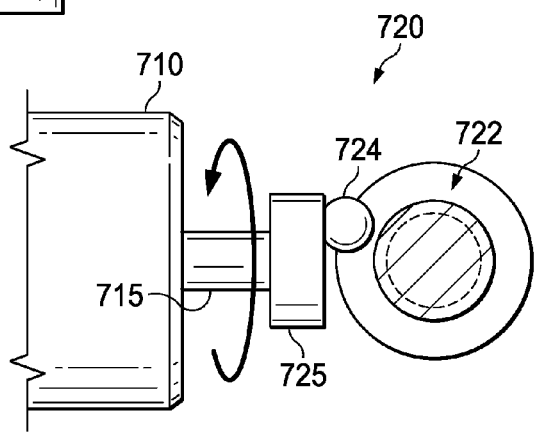
FIGS. 7C-7F shows a cross-section views of the joint of FIG. 7B.

FIG. 7B shows side view of joint 720, and FIG. 7C shows a cross-section end view of joint 720 according to one example embodiment. In the example of FIGS. 7B and 7C, the spool of hydraulic system 230 features two disks forming a trough 722 between them. A spherical member 724 resides at least partially in trough 722. Output shaft 715 features a disk 725 that includes a recess sized to receive at least part of spherical member 724. In operation, according to one example embodiment, rotation of output shaft 715 causes disk 725 to reposition spherical member 724. Repositioning spherical member 724 causes spherical member 724 to apply force against one of the disks forming trough 722. This force results in linear movement of the spool of hydraulic system 230.

In the example of FIGS. 7A-7C, however, control system 700 may fail if joint 720 jams. For example, jamming of joint 720 may lock the position of the spool of hydraulic system 230 and thus prevent both control motors 710 from operating. Accordingly, teachings of certain embodiments recognize the capability to reduce failures of joint 720.

Figure 7D:
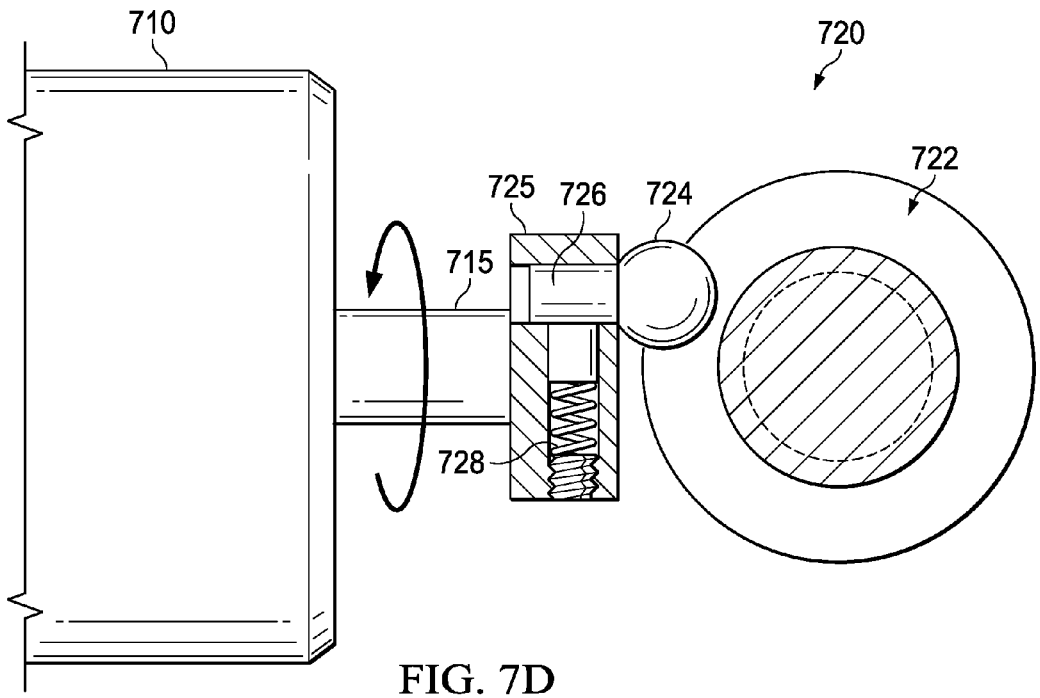
Figure 7E:
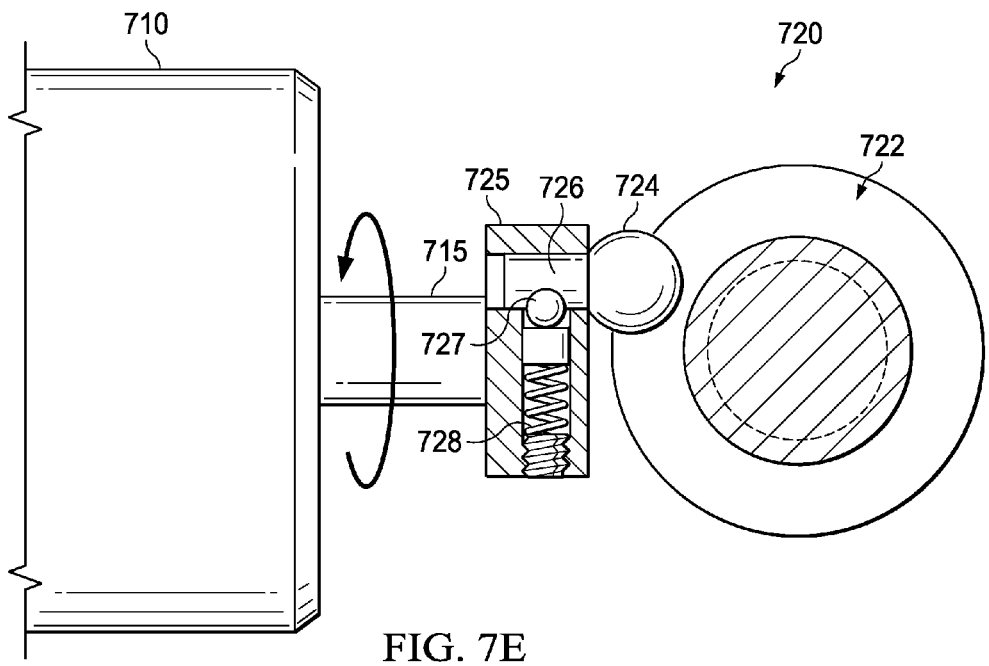
Figure 7F:
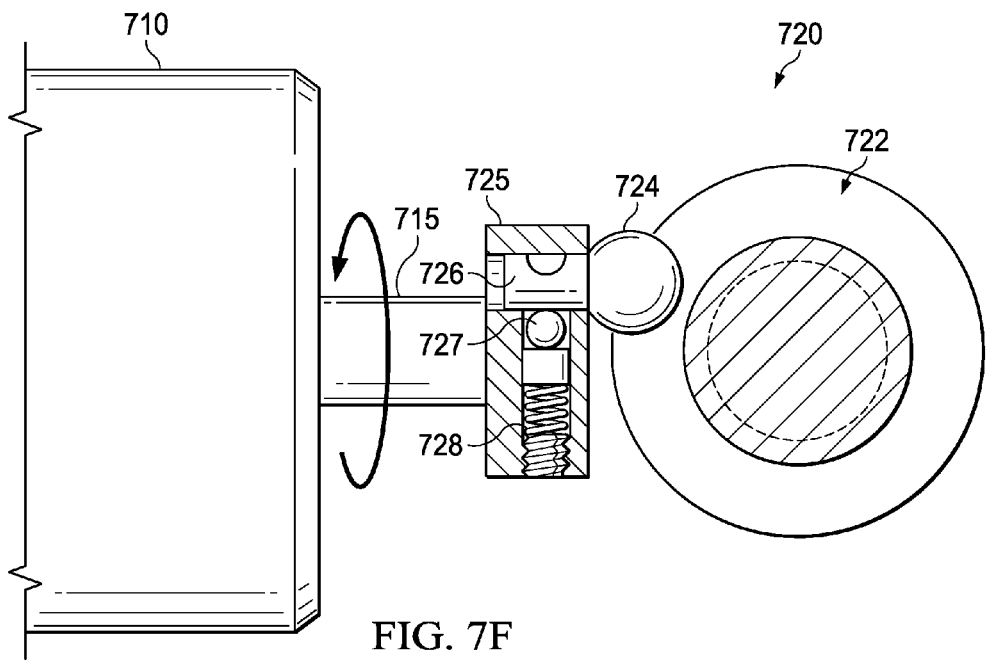

FIGS. 7D-7F show cross-section views of joint 720 according to one example embodiment. As seen in FIGS. 7D-7F, disk 725 features a pin 726, a detent member 727, and a spring 728. In this example, detent member 727 is positioned between pin 726 and spring 728, and spring 728 applies a force against detent member 727 towards pin 726. Pin 726 features a detent portion that is sized to receive at least a portion of detent member 727 when the detent portion is facing detent member 727.

Spherical member 724 is positioned between trough 722 and pin 726. During normal operation, according to one example embodiment, disk 725 repositions spherical member 724 without substantially moving pin 726. For example, spring 728 may apply sufficient force against pin 726 to prevent pin 726 from rotating during normal operation.

As friction increases in joint 720, however, spherical member 724 may cause pin 726 to rotate within disk 725. If the increased friction persists, pin 726 may continue to rotate until its detent portion faces detent member 727. At this point, spring 728 may force detent member 727 at least partially into the detent portion of pin 726, thus preventing pin 726 from rotating further.

In this example, joint 720 may continue to operate for some time with detent member 727 forced into the detent portion of pin 726. Forcing detent member 727 at least partially into the detent portion of pin 726, however, may represent visual evidence of increased friction in joint 720. This visual evidence may be apparent, for example, during a preflight check of joint 720. Evidence of increased friction in joint 720 may indicate that joint 720 is close to failing. Accordingly, teachings of certain embodiments recognize that providing visual evidence of increased friction may allow joint 720 to be repaired and/or replaced prior to failure.

Thus, teachings of certain embodiments recognize the capability to reduce failures of joint 720. In addition, teachings of certain embodiments recognize the capability to reduce failures in control motors such as control motor 710.

Figure 8A:
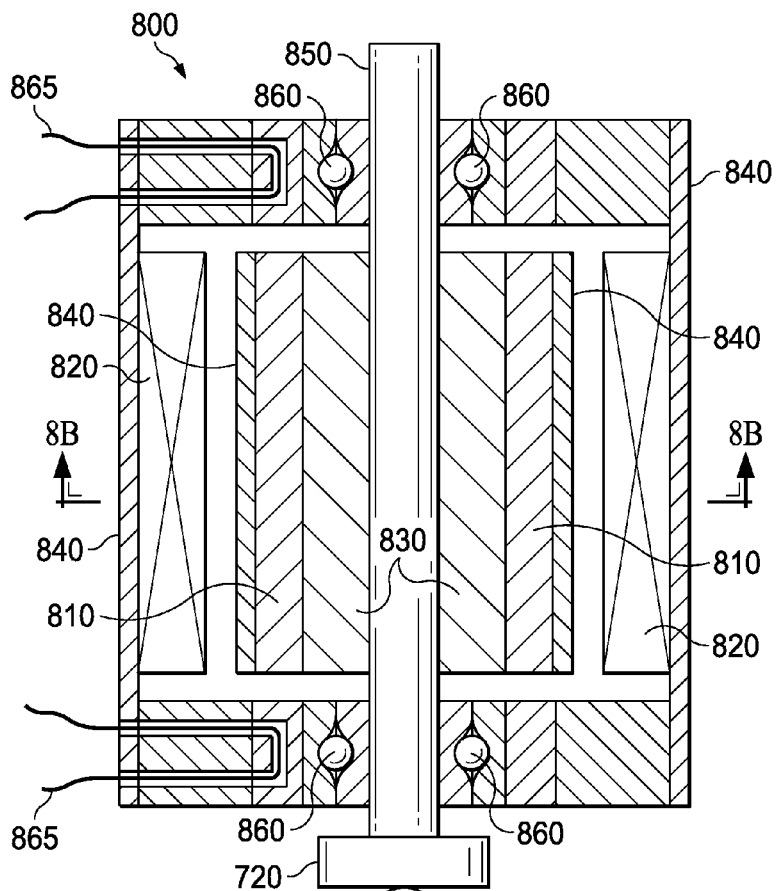
FIGS. 8A and 8B show cross-section views of a rotary control motor according to one example embodiment.
Figure 8B:
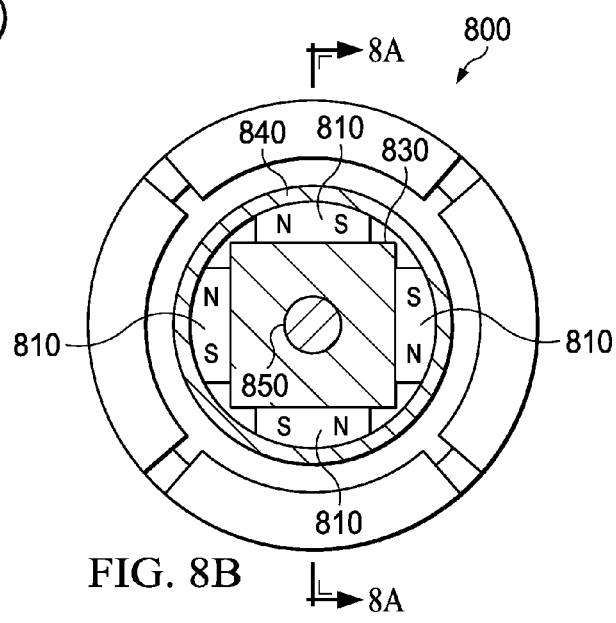

FIGS. 8A and 8B show cross-section views of a control motor 800 according to one example embodiment. In the example of FIGS. 8A and 8B, control motor 800 features magnets 810, coils 820, magnetic material 830, non-magnetic material 840, and a shaft 850. In this example, coils 820 may be considered static components, and magnet 810, magnetic material 830, and shaft 850 may be considered movable components.

In operation, magnets 810 generate magnetic flux along a magnetic flux path. Magnetic material 830 may reduce loss of flux along the magnetic flux path. Coil 820 selectively adds magnetic flux to and/or subtracts magnetic flux from the magnetic flux path. Adding or subtracting magnetic flux may cause magnets 810 and magnetic material 830 to rotate within control motor 800. Shaft 850 is coupled to magnetic material 830 and is configured to rotate with magnetic material 830.

Magnet 810 may represent any material or object that is operable to produce a magnetic field and/or generate a magnetic flux path. Examples of magnet 810 may include a permanent magnet or an electromagnetic. Coil 820 may represent any material or object that is operable to add or remove flux to or from a magnetic flux path. In some embodiments, coil 820 resembles a series of loops of conductive material, such as solid copper wire. Magnetic material 830 may represent any material or object that is attracted to (or repulsed by) a magnet. In some embodiments, magnetic material 830 may include ferromagnetic materials, such as iron, nickel, cobalt, rare earth magnets, and some alloys. Non-magnetic material 840 may represent material is not attracted to (or repulsed by) a magnet. Examples of non-magnetic material 840 may include some rubbers, plastics, and wood. In the example of FIGS. 8A and 8B, non-magnetic material may hold magnets 810 against magnetic material 930.

In the example of FIG. 8A, shaft 850 rotates within control motor 800. In some embodiments, bearings 860 may be provided to separate shaft 850 from static components of control motor 800 and allow for rotation of shaft 850 within control motor 800. Bearings 860 may fail during operation, however, and restrict rotation of shaft 850. Accordingly, teachings of certain embodiments recognize the capability to provide break wires 865 proximate to bearings 860. Break wires 865 may detect failure of a bearing 860 by severing in response to a failure of the bearing 860. Teachings of certain embodiments recognize that detecting failure of bearing 860 may allow maintenance workers to replace the bearing 860 so as to prevent further damage and/or more catastrophic failures.

In addition to bearing failure, control motor 800 may also be prone to failure due to magnetic seizing. In the example of FIGS. 8A and 8B, magnets 810 and magnetic material 830 are disposed within control motor 800 adjacent to coil 820. During normal operation, magnets 810 and magnetic material 830 may be free to rotate within control motor 800 adjacent to coil 820. A failure can occur, however, if magnets 810 or magnetic material 830 seizes to coil 820. In this failure mode, magnets 810 and magnetic material 830 become fixed and prevent shaft 850 from rotating. Preventing shaft 850 from rotating may, in turn, prevent shaft 850 from moving the spool of hydraulic system 230, which may result in a failure of the actuator 220 coupled to hydraulic system 230. Accordingly, as will be explained in greater detail below, teachings of certain embodiments recognize the capability to prevent failures of actuator 220 and hydraulic system 230 by preventing magnetic seizing of the control motor.

Figure 9A:
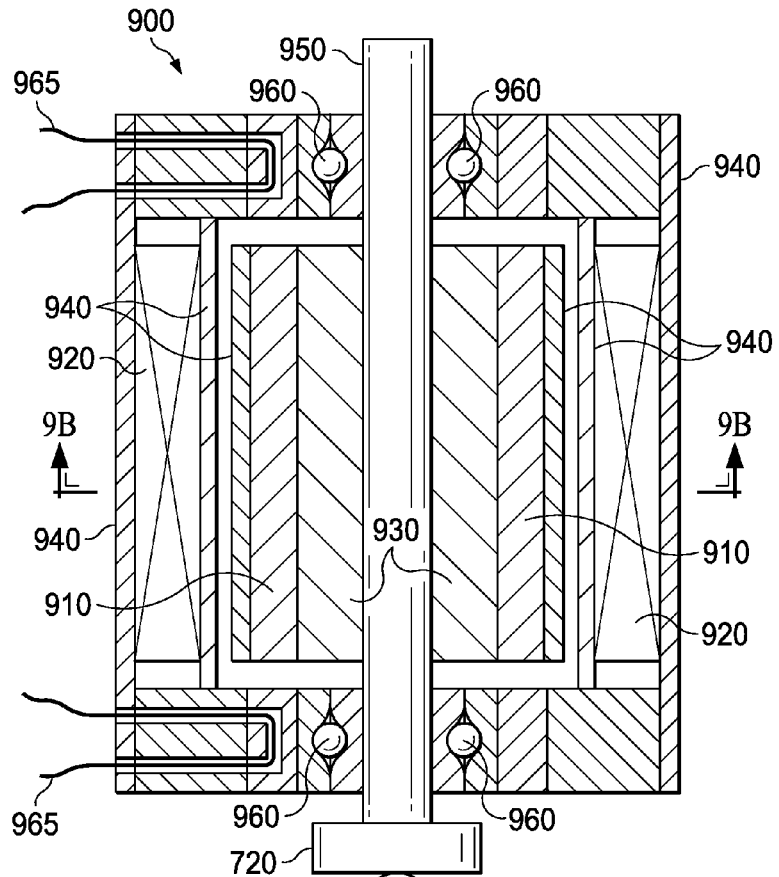
FIGS. 9A and 9B show cross-section views of a rotary control motor according to another example embodiment.
Figure 9B:
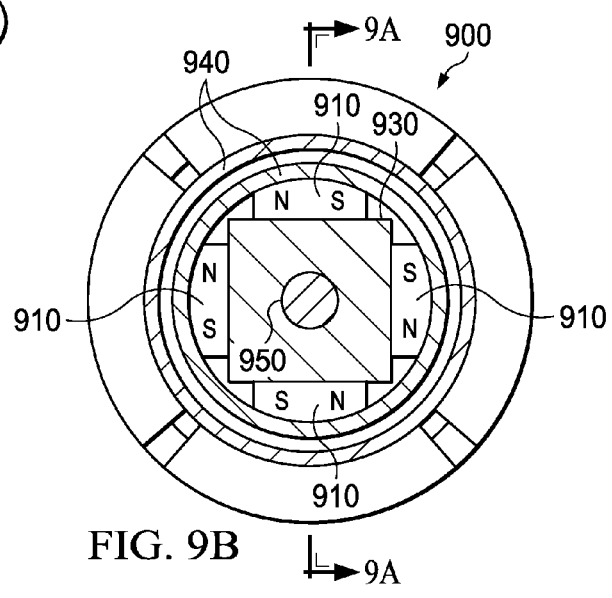

FIGS. 9A and 9B show cross-section views of a control motor 900 according to one example embodiment. In the example of FIGS. 9A and 9B, control motor 900 features magnets 910, coils 920, magnetic material 930, non-magnetic material 940, and a shaft 950. In some embodiments, some of these components may resemble the magnets 810, coils 820, magnetic material 830, non-magnetic material 840, and shaft 850 of control motor 800. Unlike control motor 800, however, control motor 900 features additional non-magnetic material 940 adjacent to coil 920 and separating coil 920 from magnets 910 and magnetic material 930. Teachings of certain embodiments recognize that the additional non-magnetic material 940 may prevent coil 920 from seizing to magnets 910 and/or magnetic material 930 by preventing physical contact between coil 920 and the magnets 910 and/or magnetic material 930.

Figure 10A:
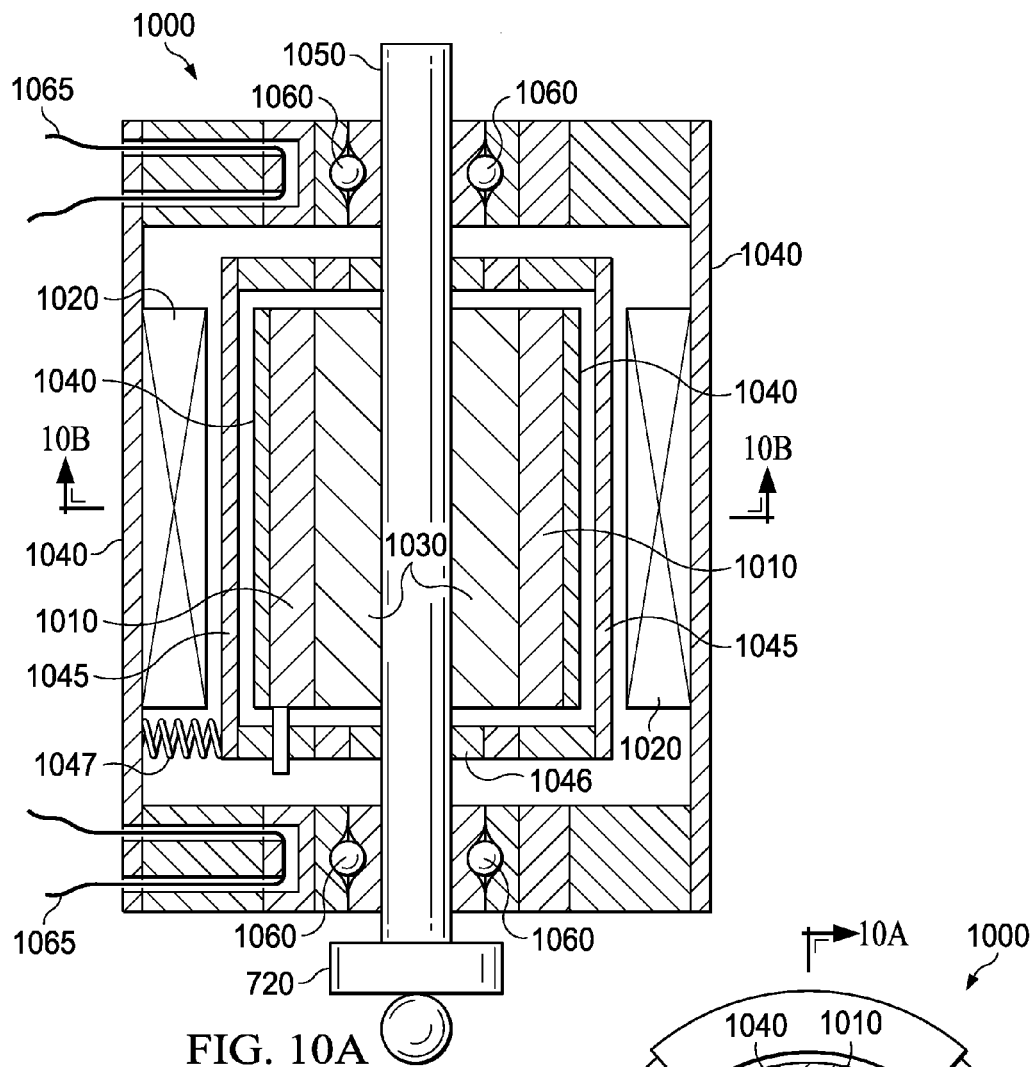
FIGS. 10A and 10B show cross-section views of a rotary control motor according to yet another example embodiment.
Figure 10B:
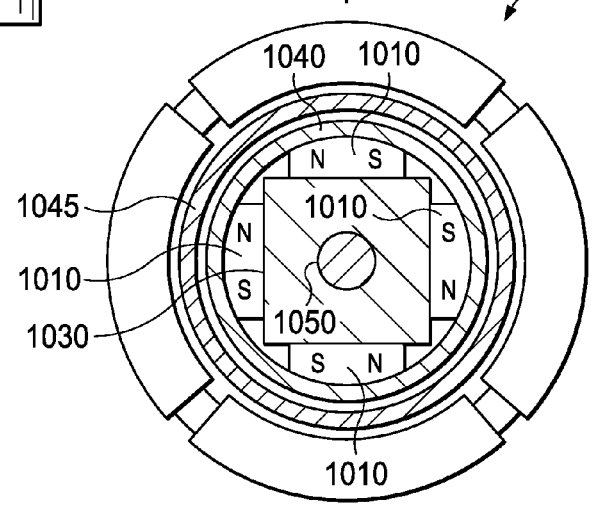

FIGS. 10A and 10B show cross-section views of a control motor 900 according to another example embodiment. In the example of FIGS. 10A and 10B, control motor 1000 features magnets 1010, coils 1020, magnetic material 1030, non-magnetic material 1040, and a shaft 1050. In some embodiments, some of these components may resemble the magnets 810, coils 820, magnetic material 830, non-magnetic material 840, and shaft 850 of control motor 800.

Unlike control motor 800, however, control motor 1000 features additional non-magnetic material 1045 separating coil 1020 from magnets 1010 and magnetic material 1030. In the example of FIGS. 10A and 10B, the additional non-magnetic material 1045 is at least partially movable relative to both coil 1020 and the moving components of magnets 1010, magnetic material 1030, and shaft 1050. For example, in FIG. 10A, bearings 1046 allow the additional non-magnetic material 1045 to rotate relative to shaft 1050 (i.e., shaft 1050 is free to rotate inside non-magnetic material 1045 and/or non-magnetic material 1045 is free to rotate about shaft 1050).

In addition, a spring 1047 couples the additional non-magnetic material 1045 to the static portion of control motor 1000. In this example, spring 1047 allows the additional non-magnetic material 1045 to at least partially move relative to the static portion of control motor 1000. In addition, spring 1047 restricts (but does not completely prevent) rotation of non-magnetic material 1045 relative to shaft 1050.

Teachings of certain embodiments recognize that the additional non-magnetic material 1045 may prevent coil 1020 from seizing to magnets 1010 and/or magnetic material 1030 by preventing physical contact between coil 1020 and the magnets 1010 and/or magnetic material 1030. In addition, allowing the additional non-magnetic material 1045 to move relative to both the movable and static components of control motor 1000 may further reduce seizing by control motor 1000 and may reduce friction and wear within control motor 1000

In each of the example control motors 800, 900, and 1000, break wires are provided to detect bearing failures. In each of these examples, break wires may detect failure of a bearing by severing in response to a failure of the bearing. Teachings of certain embodiments recognize, however, other mechanisms for detecting failure of a bearing.

Figure 11A:
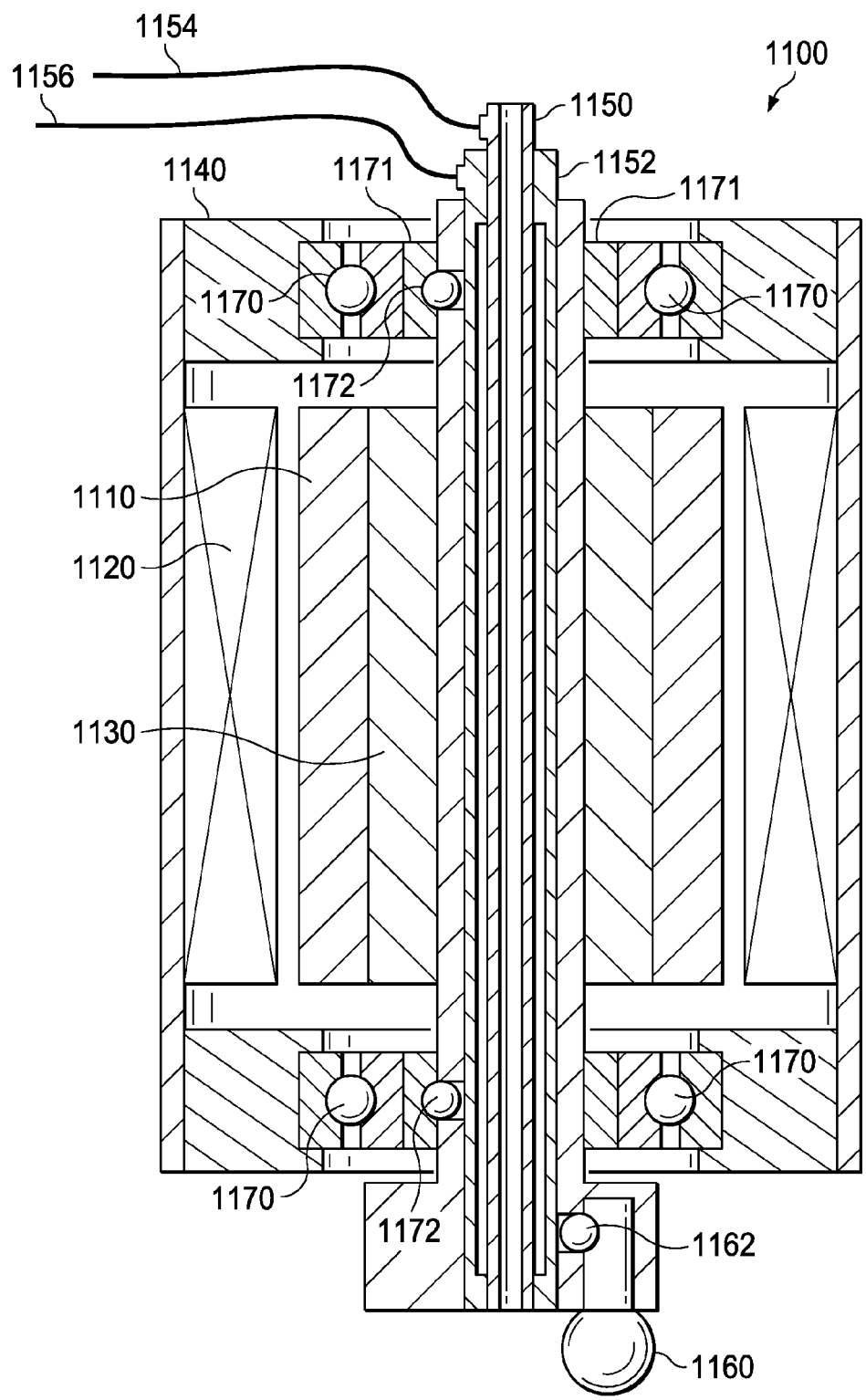
FIGS. 11A and 11B show cross-section views of a rotary control motor according to yet another example embodiment.
Figure 11B:
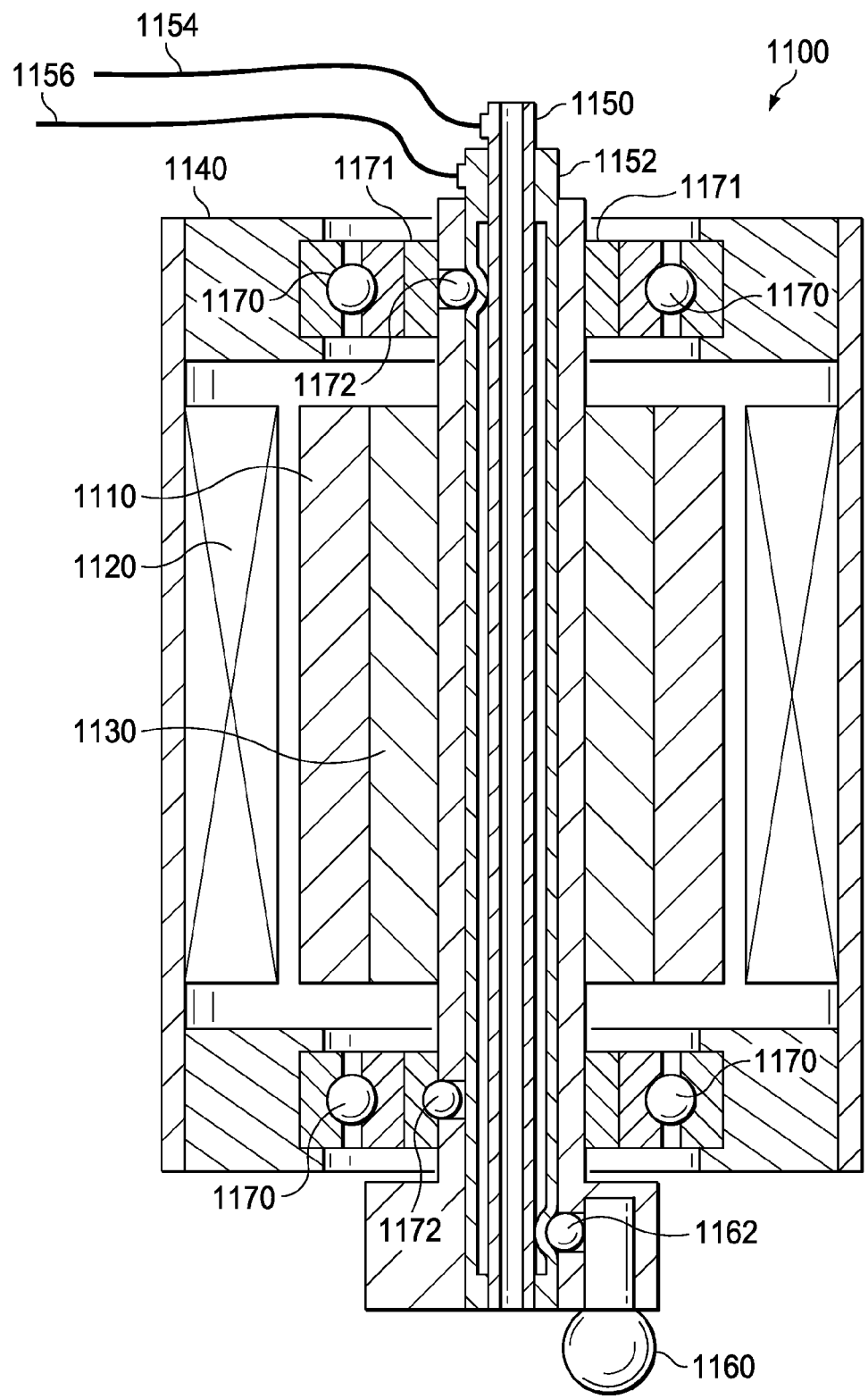

FIGS. 11A and 11B show cross-section views of a control motor 1100 according to one example embodiment. In the example of FIGS. 11A and 11B, control motor 1100 features magnets 1110, coils 1120, magnetic material 1130, non-magnetic material 1140, and a shaft 1150. In some embodiments, some of these components may resemble the magnets 810, coils 820, magnetic material 830, non-magnetic material 840, and shaft 850 of control motor 800.

Unlike control motor 800, however, control motor 1100 features a metal tube 1152 positioned around shaft 1150. In one example embodiment, metal tube 1152 is aluminum or an aluminum alloy. Control motor 1100 also features electrical transmission lines 1154 and 1154. In the example of FIGS. 11A and 11B, electrical transmission line 1154 is associated with shaft 1150, and electrical transmission line 1156 is associated with tube 1152. In one example embodiment, electrical transmission lines 1154 and 1156 are electrically coupled to shaft 1150 and tube 1152. In another example embodiment, electrical transmission lines 1154 and 1156 are located adjacent to shaft 1150 and tube 1152.

Control motor 1100 also features jam members 1162 and 1172. Jam member 1162 is located proximate to spherical member 1160. In one example embodiment, spherical member 1162 may resemble and/or operate similarly to spherical member 724. Jam members 1172 are located proximate to bearings 1170 and secondary bearings 1171. In one example embodiment, bearings 1170 may resemble and/or operate similarly to bearings 860. Secondary bearings 1171 may act as backup bearings and engage in response to a failure by bearings 1170.

In operation, according to one example embodiment, elements such as spherical member 1160 and bearings 1170 may jam or otherwise fail. FIG. 11A shows the position of jam members 1162 and 1172 prior to failure by spherical member 1160 and bearings 1170. As seen in FIG. 11B, failure by spherical member 1160 or a bearing 1170 may cause jam members 1162 and 1172 to deform part of tube 1152. For example, a failure by one of the bearings 1170 may cause secondary bearings 1171 to engage, which causes secondary bearings 1171 to displace jam members 1172.

In the example of FIG. 11B, deforming tube 1152 relieves the jam and causes tube 1152 to contact shaft 1150, thus completing an electrical circuit between electrical transmission line 1154 and electrical transmission line 1156. Completing the electrical circuit may alert maintenance workers to a failure within control motor 1100 and may allow maintenance workers to perform repairs so as to prevent further damage and/or more catastrophic failures. In addition, deforming tube 1152 may relieve the jam by spherical member 1160 and/or bearings 1170 and therefore allow control motor 1100 to continue operating until repairs can be made.

Figure 12A:
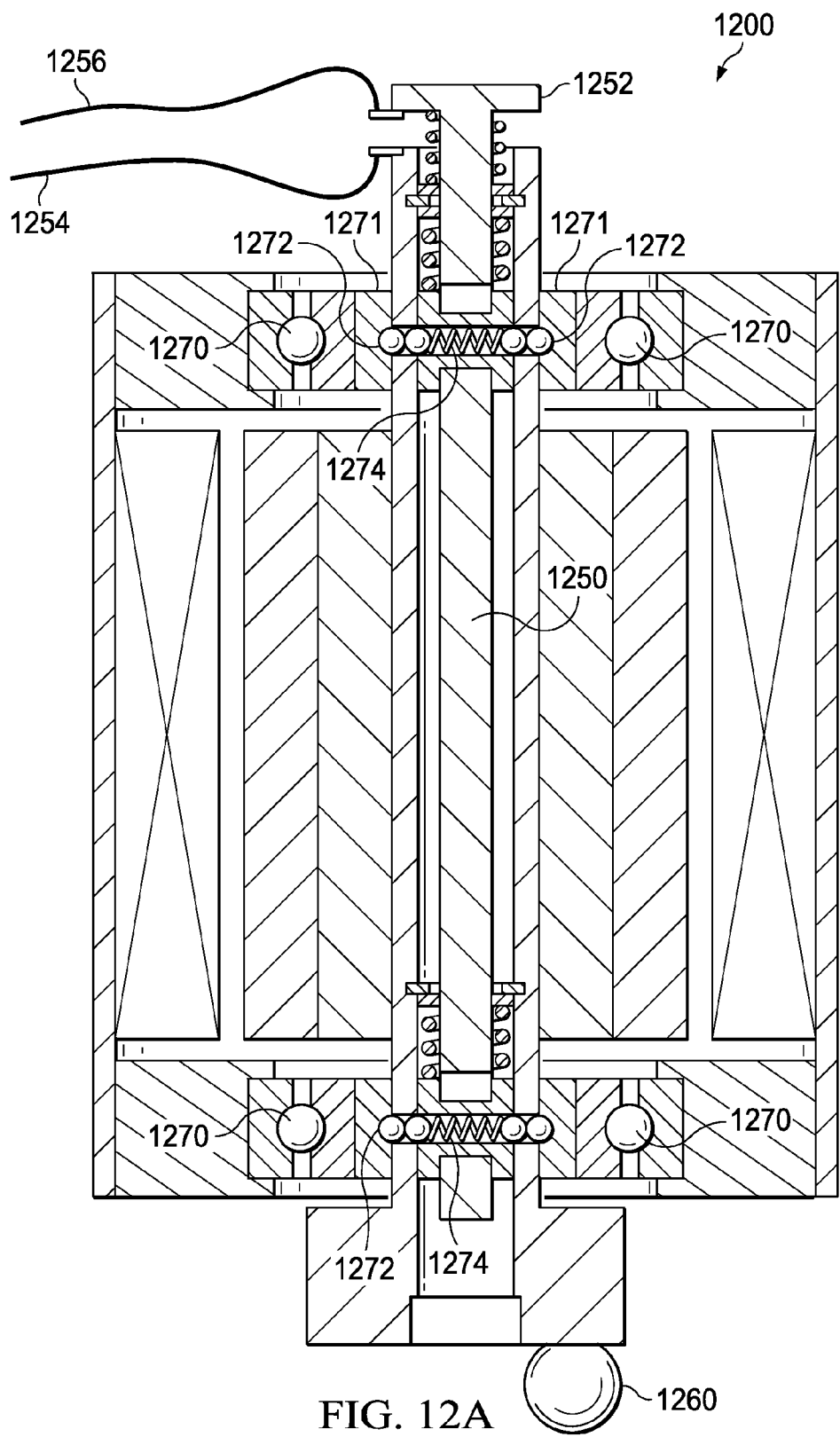
FIGS. 12A, 12B, and 12C show cross-section views of a rotary control motor according to yet another example embodiment.
Figure 12B:
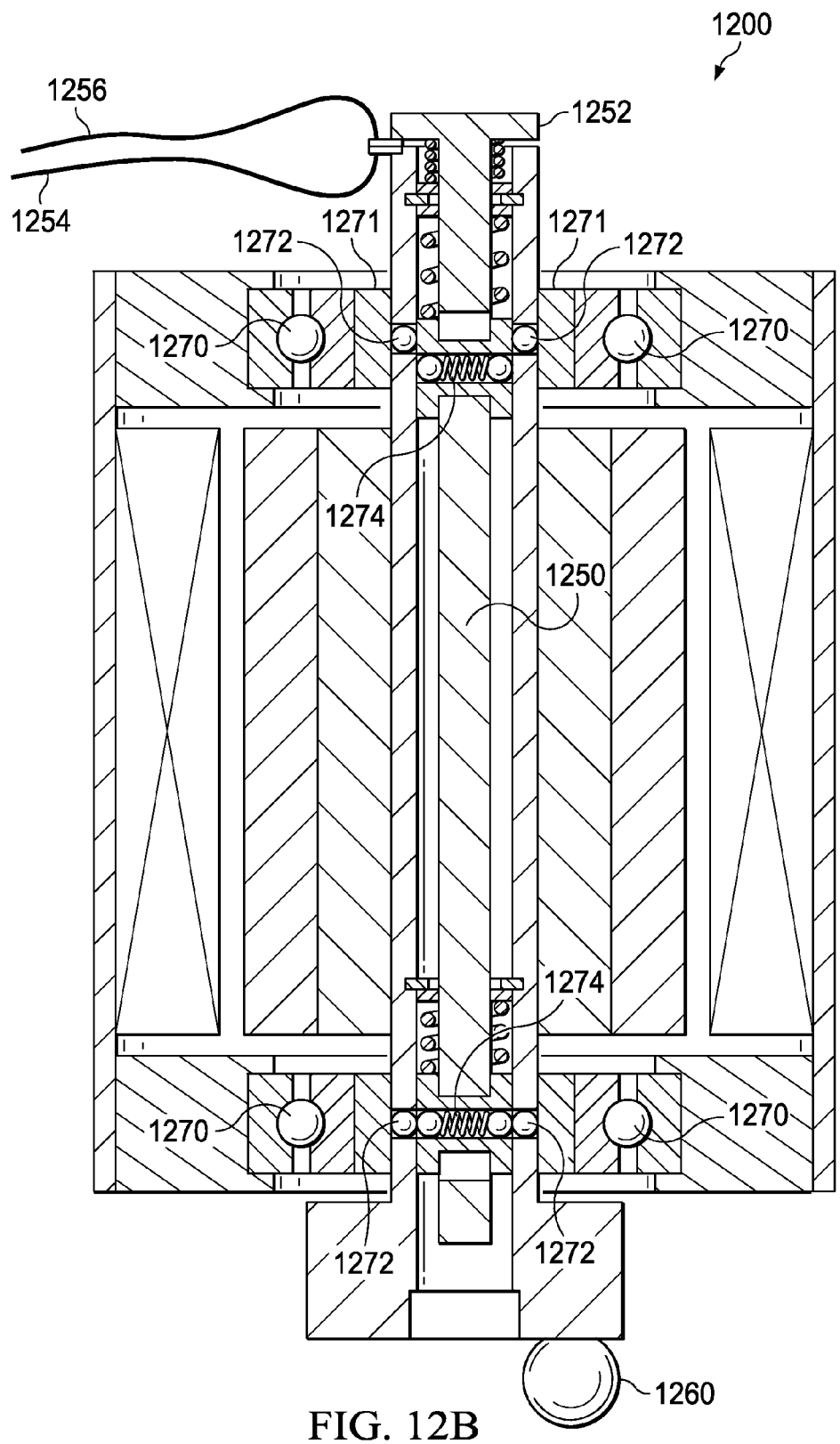
Figure 12C:
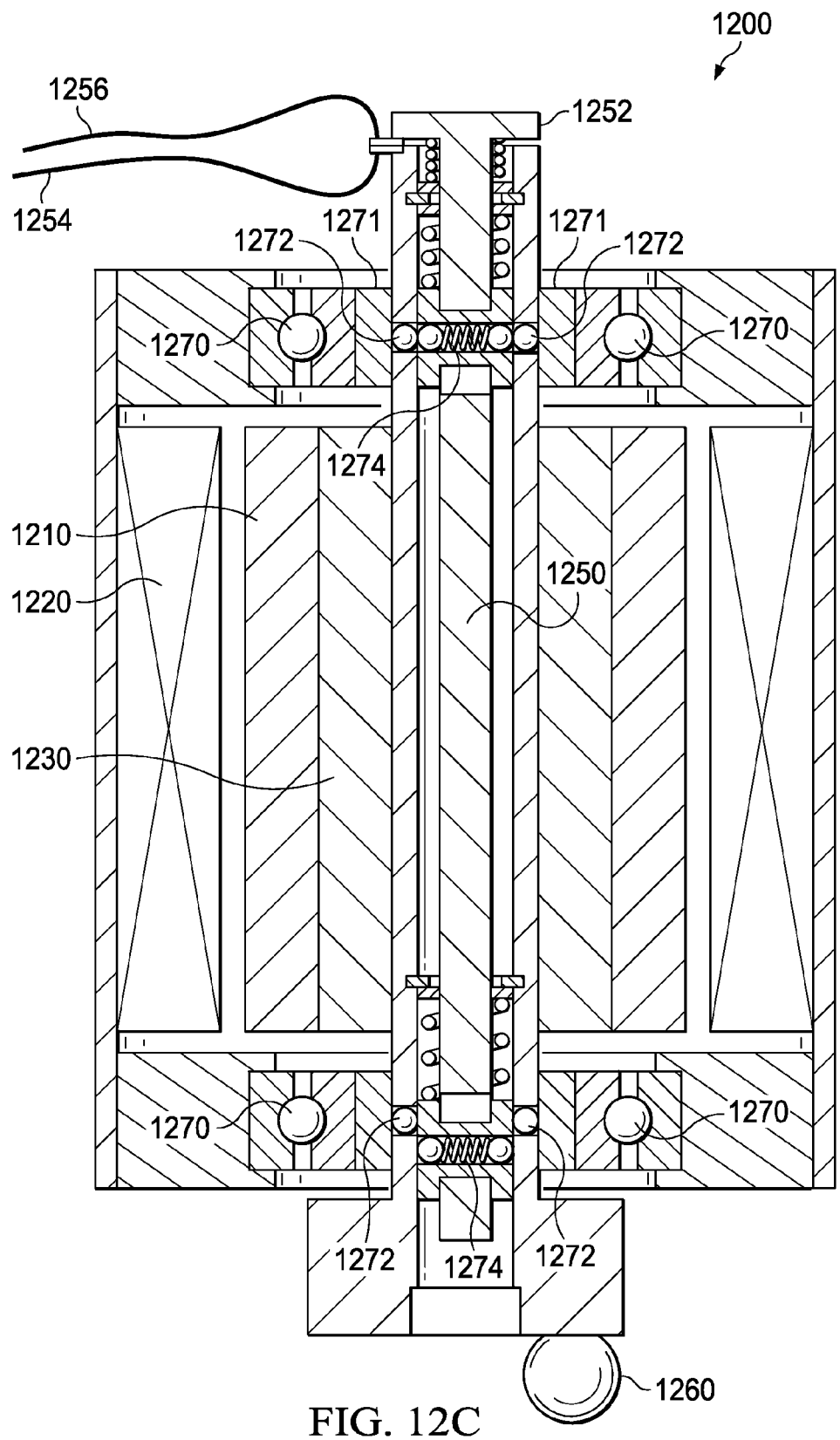

FIGS. 12A-12C show cross-section views of a control motor 1200 according to another example embodiment. In the example of FIGS. 12A and 12B, control motor 1200 features magnets 1210, coils 1220, magnetic material 1230, non-magnetic material 1240, a shaft 1250, a spherical member 1260, bearings 1270, and secondary bearings 1271. In some embodiments, some of these components may resemble the magnets 1110, coils 1120, magnetic material 1130, non-magnetic material 1140, shaft 1150, spherical member 1160, bearings 1170, and secondary bearings 1171 of control motor 1100.

Unlike control motor 1100, however, control motor 1200 features resettable ball detents 1172 and springs 1274. FIG. 12A shows the positions of ball detents 1272 prior to failure by bearings 1270. As seen in FIG. 12A, spring 1274 forces ball detents 1172 against secondary bearings 1271.

FIGS. 12B and 12C show the positions of ball detents 1272 after failure by bearings 1270. In these examples, failure of bearings 1270 causes secondary bearings 1271 to force ball detents 1272 back against spring 1274. Forcing ball detents 1272 back against spring 1274 pulls detent pin 1252 downwards and closes the electrical circuit between electrical transmission line 1254 and electrical transmission line 1256.

In some embodiments, ball detents 1272 may be reset after the bearing jam is repaired. For example, after bearings 1270 and/or secondary bearings 1271 are reset/repaired/replaced, detent pin 1252 may be pulled upwards, and spring 1274 may force ball detents 1272 into the original position. Teachings of certain embodiments recognize that providing resettable ball detents may reduce the time and expense necessary to repair a bearing jam.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body;
a power train coupled to the body and comprising a power source and a drive shaft coupled to the power source;
a hub coupled to the drive shaft;
a rotor blade coupled to the hub;
a hydraulic actuator in mechanical communication with the rotor blade and operable to change a position of the rotor blade;
an actuator control valve system operable to regulate a flow of fluid to the hydraulic actuator, the actuator control valve system comprising a servo valve and a spool extending through the servo valve; and
a control motor in mechanical communication with the actuator control valve system, the control motor comprising:
a first permanent magnet operable to generate a first magnetic flux path;
a coil operable to selectively add magnetic flux to and subtract magnetic flux from the magnetic flux flowing in the first magnetic flux path, wherein one of the first permanent magnet and the coil is a movable component and the other one of the first permanent magnet and the coil is a static component, the movable component operable to rotate relative to the static component in response to variations in flux flowing in the first magnetic flux path;
a shaft coupled to the movable component such that the shaft is operable to rotate in response to variations in flux flowing in the first magnetic flux path;
a first non-magnetic material disposed between at least one of the movable components and at least one of the static components and operable to prevent physical contact between at least one of the movable components and at least one of the static components, wherein the first non-magnetic material is at least partially movable relative to both the movable component and the static component;
and
A joint coupled between the shaft and the spool and operable to convert rotations of the shaft into axial movements of the spool.

2. The rotorcraft of claim 1, wherein a spring couples the first non-magnetic material to the movable component.

3. The rotorcraft of claim 1, the joint comprising:
a pin comprising a detent portion;
a detent member adjacent to the pin and sized to fit at least partially within the detent portion;
a spring configured to apply a force against the detent member towards the pin, the detent member positioned between the spring and the pin; and
a substantially spherical member adjacent the pin and partially disposed within a recess of the spool, the substantially spherical member operable to reposition the pin such that the detent portion is positioned to at least partially receive the detent member.

4. The rotorcraft of claim 1, the control motor further comprising:
a bearing separating the shaft from the static component; and
a break wire adjacent to the bearing, the break wire configured to sever in response to a failure of the bearing.

5. The rotorcraft of claim 1, the control motor further comprising:
a metal tube positioned around the shaft;
a first electrical transmission line associated with the shaft;
a second electrical transmission line associated with the metal tube;
a bearing separating the metal tube from the static component; and
a jam member disposed between the bearing and the metal tube, the jam member configured to deform the metal tube in response to a failure of the bearing such the deformation closes an electrical circuit between the first electrical transmission line and the second electrical transmission line.

* * * * *